United States Patent [19]

Ogino

[11] Patent Number: 5,663,615
[45] Date of Patent: Sep. 2, 1997

[54] RECIPROCAL DEFLECTION TYPE CRT DISPLAYING APPARATUS

[75] Inventor: Masanori Ogino, Yokohama, Japan

[73] Assignee: Hitachi, Ltd., Tokyo, Japan

[21] Appl. No.: 544,960

[22] Filed: Oct. 18, 1995

[30] Foreign Application Priority Data

Oct. 20, 1994 [JP] Japan ................. 6-254994

[51] Int. Cl.$^6$ .............. H01Q 3/22; H01Q 3/24; H01Q 3/26
[52] U.S. Cl. .................. 315/371; 348/806; 348/626
[58] Field of Search ................... 315/371; 348/806, 348/626

[56] References Cited

U.S. PATENT DOCUMENTS

| | | |
|---|---|---|
| 2,717,329 | 9/1955 | Jones et al. . |
| 2,817,787 | 12/1957 | Kovasznay . |
| 3,662,102 | 5/1972 | Herndon ................. 178/7.7 |
| 4,638,308 | 1/1987 | Kuwabara et al. ............. 340/732 |
| 4,926,098 | 5/1990 | Tarrillo ........................ 315/408 |
| 5,349,274 | 9/1994 | Watanabe et al. .............. 315/395 |

*Primary Examiner*—Theodore M. Blum
*Attorney, Agent, or Firm*—Kenyon & Kenyon

[57] ABSTRACT

A reciprocative deflection type CRT display apparatus includes a reciprocative horizontal deflection circuit formed by a horizontal deflecting direction change-over circuit, a ½-frequency divider, a horizontal deflecting coil and an S-like distortion correcting capacitor. The horizontal deflecting direction changeover circuit connects one end of the horizontal deflecting coil to a power source and the ground alternatively upon every horizontal scanning period, whereby horizontal deflection is alternately changed over between forward and backward directions without need for generating a flyback pulse of large amplitude. Power loss involved in operation of a horizontal output switching element constituting the horizontal deflection switching circuit is reduced to about ¹⁄₁₀ or less when compared with the conventional CRT.

3 Claims, 11 Drawing Sheets

STEPWISE VERTICAL
DEFLECTION CIRCUIT
IS NOT PROVIDED

STEPWISE VERTICAL
DEFLECTION CIRCUIT
IS PROVIDED

RECIPROCAL DEFLECTION TYPE CRT DISPLAYING APPARATUS

BACKGROUND OF THE INVENTION

The present invention relates to a reciprocative deflection type CRT display apparatus suited for displaying picture information with a superhigh definition.

Development and progress of computer techniques in recent years are really remarkable, being supported by digital circuit technology. By contrast, the display techniques for visualizing the information processed by the computer makes a very low progress. Even at the present time, there exists no other device than the CRT (cathode ray tube) device which is capable of reproducing motion pictures in natural colors in greatest detail or with a highest definition.

Unfortunately, however, the maximum horizontal frequency that can be realized at present in the CRT display dies not exceed about 130 kHz. Further, the number of the scanning lines is about 2000 lines at maximum. In most of the CRT display devices, the scanning line number remains less than about 1024 lines.

One of the reasons for such situations as mentioned above can be explained by the fact that attempt for realizing the horizontal scanning frequency greater than ca. 130 kHz is inevitably accompanied with excessively large power consumption in the electromagnetic type horizontal deflection output circuit, the reason for which in turn can be explained by the fact that because of necessity for generation of a flyback pulse of a high voltage on the order of 1 kV at the horizontal flyback or retrace interval, as well known in the art, a great difficulty is encountered in reducing the power loss involved in breaking or turning off the switching element which is designed to be capable of withstanding such high voltage as mentioned above.

FIG. 1 of the accompanying drawings shows a configuration of a horizontal deflection output circuit known heretofore. In this figure, reference numeral 1 designates a horizontal driving pulse input terminal, 2 denotes a horizontal output transistor, 3 denotes a damper diode, 4 denotes a horizontal deflecting coil, 5 denotes a power supplying choke coil, 6 denotes an electric power source, 7 denotes a horizontal retrace (flyback) interval resonance capacitor and 8 denotes an S-like distortion correcting capacitor.

Power loss brought about upon transition in turning off the horizontal output transistor 2 will be elucidated below by reference to waveform diagrams of FIGS. 2 and 3.

In FIG. 2, a curve 9 represents a waveform of a current flowing through the horizontal deflecting coil 4 and a curve 10 represents a waveform of a voltage appearing across the horizontal deflecting coil 4.

FIG. 3 shows exaggeratedly a waveform of a rise-up starting portion of a flyback (retrace) pulse. In this figure, a curve 11 represents a collector current of the horizontal output transistor 2 and a curve 12 represents a collector voltage thereof. These curves are depicted on the assumption that the breaking of the transistor current is started at a time point t=0 and terminated at a time point t=$t_f$ and that during this period, the current decreases linearly. Then, the power loss P accompanying the breaking of the transistor current can be determined in accordance with the expression (1) mentioned below. Further, because the horizontal retrace (or flyback) interval $T_{ret}$ is usually about 15% of the horizontal scanning period $T_H$, the undermentioned expression (2) applies valid. Furthermore, from the expressions (1) and (2), the expression (3) mentioned below applies valid as well.

$$P = \frac{1}{T_H} \int_0^{t_f} IE\, dt \tag{1}$$

$$\approx \frac{1}{T_H} \int_0^{t_f} I_0 \left(1 - \frac{t}{t_f}\right) \frac{I_0 t^2}{2Ct_f}\, dt$$

$$= \frac{(I_0 t_f)^2}{24 T_H C} = \frac{LI_0^2}{24 T_H} \cdot \frac{t_f^2}{LC}$$

$$LC \approx \frac{T_H^2}{400} \tag{2}$$

$$\therefore P \approx 16.7\, LI_0^2 \frac{t_f^2}{T_H^3} \tag{3}$$

where $T_H$ represents a horizontal scanning period,
L represents inductance of the horizontal deflecting coil 4,
C represents capacitance of the resonance capacitor 7,
$LI_0^2/2$ represents deflection energy which is, constant, and
$t_f$ represents the fall time.

As can be seen from the above expressions, the power loss is proportional to a square of the fall time $t_f$ and in inverse proportion to a cube of the horizontal scanning period $T_H$.

A product of a current peak value $I_0$ and a voltage peak value $V_0$ required for the output transistor is in inverse proportion to the horizontal scanning period $T_H$, as can be seen from the following expression:

$$I_0 V_0 = I_0^2 \sqrt{LC} = I_0^2 L/\sqrt{LC} \tag{4}$$

$$\approx 20\, LI_0^2/T_H$$

(2)

In the above expression (2), parenthesized number inserted underneath the equality sign represents the identification number of the expression from which the equality is derived. The same applies to those expressions which will be mentioned hereinafter.

It can be seen from the expressions (3) and (4) that the product of $I_0 V_0 P$ is proportional to a square of the fall time $t_f$ and a biquadrate of the horizontal scanning frequency. For this reason, a great difficulty has heretofore been encountered in increasing the horizontal deflection frequency beyond a certain limit.

Besides, heat generation of the deflecting coil itself presents a problem remaining to be solved, because in a high frequency range, power loss ascribable to eddy currents increases in proportion to the frequency. More specifically, the eddy current loss becomes maximum at a center point of the flyback or retrace interval at which the rate of change of the deflecting magnetic field intensity becomes maximum.

As the hitherto known techniques which are directed to development of the reciprocative horizontal deflection systems for the CRT device as with the case of the present invention, there may be mentioned those disclosed in the specifications of U.S. Pat. Nos. 3,662,102, 2,717,329, 2,817, 787 and 4,638,308. However, with these prior art techniques, the problem of zigzagged vertical line interference which will be described hereinafter is neither recognized nor tackled at all, much less the solution thereof.

SUMMARY OF THE INVENTION

In the light of the state of the art described above, it is one of primary objects of the present invention to provide a novel scanning type CRT display apparatus which allows the horizontal deflection frequency to be increased beyond ca.

130 kHz while ensuring low power loss, by overcoming the problems or shortcomings of the prior art techniques.

Another object of the present invention is to provide measures or facilities for solving or compensating for various inconveniences encountered in implementation of the novel scanning type CRT display apparatus.

In view of the above and other objects which will become apparent as the description proceeds, there is provided according to an aspect of the present invention to provide a reciprocative horizontal deflection circuit for a horizontal deflection circuit of a CRT display apparatus.

On the other hand, it is taught according to another aspect of the present invention to impart a stepwise deflection capability to a vertical deflection circuit of the CRT display apparatus.

According to yet another aspect of the present invention, there is provided a circuit for correcting or suppressing zigzagged vertical line interference in the CRT display apparatus.

According to a further aspect of the invention, there is provided a picture signal amplitude modulating circuit for the CRT display apparatus.

The reciprocative horizontal deflection circuit is designed such that scanning operations in a forward direction and in a reverse or backward direction are alternatively repeated. Accordingly, generation of the flyback pulse (see FIG. 2, curve 10) as required in the conventional CRT display apparatus can be rendered unnecessary. Thus, the value of the resonance capacitor can be increased by a factor of "10" or more. Consequently, the power loss involved in the switching operation of the switching element can be decreased to about one tenth or less. Furthermore, when compared with the conventional CRT display apparatus, the voltage level which the switching element is required to withstand can be decreased to about one fifth. This in turn means that the fall time and hence the power loss can further be decreased by using an inexpensive switching element. Additionally, the eddy current loss of the deflecting coil can equally be reduced.

The correcting circuit mentioned above serves for solving a problem of nonuniform distances between the scanning lines at both left and right ends on a screen of the CRT, which problem is ascribable to adoption of the novel reciprocative bidirectional horizontal deflection circuit.

On the other hand, the picture display speed modulation can be realized by providing an auxiliary horizontal deflecting coil in a preferred mode for carrying out the present invention. In another mode for carrying out the invention, the picture display speed modulation can be realized by modulating the horizontal deflection speed or picture signal read-out speed in dependence on horizontal linearity distortion. In any case, the zigzagged vertical line interference can be compensated for.

The picture signal amplitude modulating circuit can function for canceling out nonuniformity of luminance among the scanning lines by modulating the picture signal amplitude in dependence on the horizontal linearity distortion.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which.

DESCRIPTION OF THE PREFERRED EMBODIMENTS

Now, the present invention will be described in detail in conjunction with what is presently considered as preferred or typical embodiments thereof by reference to the drawings.

Figure 4:
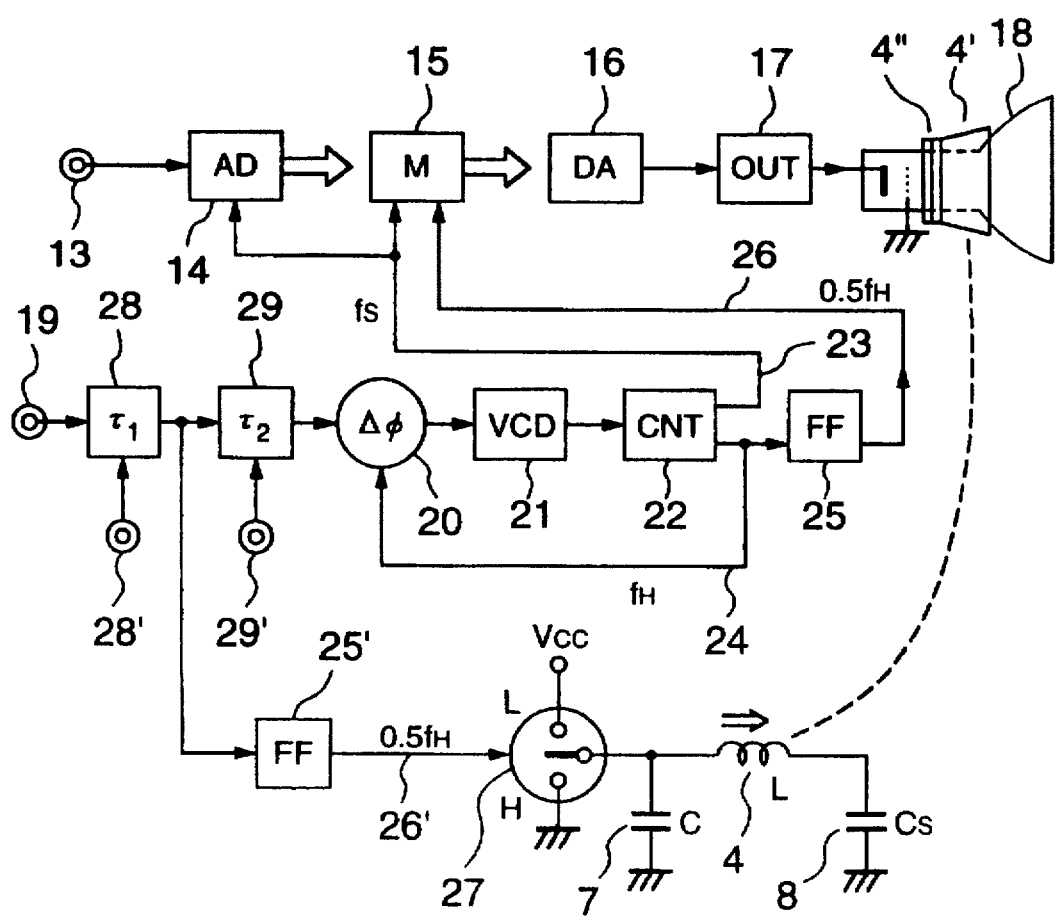
FIG. 4 is a block diagram showing a circuit configuration of a reciprocative horizontal deflection circuit according to an embodiment of the present invention.

FIG. 4 is a block diagram showing a circuit configuration of a reciprocative deflection type CRT display apparatus according to a first embodiment of the present invention.

In the figure, reference numeral 13 denotes a picture signal input terminal, 14 denotes an analogue-to-digital converter or A/D converter, 15 denotes a line scanning direction alternating circuit realized by using a semiconductor memory device, 16 denotes a digital-to-analogue converter or D/A converter for short, 17 denotes an output amplifier, 18 denotes a CRT (cathode-ray tube), 4' denotes a horizontal deflection yoke, 4" denotes an auxiliary horizontal deflection yoke, 19 denotes a horizontal synchronizing signal input terminal, 20 denotes a phase detector, 21 denotes a voltage-controlled oscillator and reference numeral 22 denotes a counter, wherein the phase detector 20, the voltage-controlled oscillator 21, and the counter 22 cooperate to constitute a phase-locked loop or PLL in abbreviation. As the outputs of the counter 22, there are produced at least a pulse signal 23 having a sampling frequency $f_s$ and a pulse signal 24 having a horizontal frequency $f_H$. Further, reference numerals 25 and 25' denote flip-flop circuits each of which serves for dividing the horizontal frequency $f_H$ by "2", whereby there can be derived from the outputs of the ½-frequency-division flip-flops 25 and 25', the pulse signals 26 and 26' each having a frequency equal to 0.5 $f_H$, respectively. (Hereinafter, these flip-flops will also be referred to as the ½-frequency division flip-flops). Furthermore, reference numeral 27 designates a horizontal deflecting direction change-over switch circuit which is so implemented as to be connected to the ground potential GND when the pulse signal 26' is at a high level ("H" level), while being connected to a power source when the pulse signal 26' is at a low level ("L" level). Reference numeral 4 denotes a horizontal deflecting coil, and numeral 8 denotes an S-like distortion correcting capacitor, both of which have been described hereinbefore. The horizontal deflecting coil 4 is mounted on the horizontal deflection yoke 4' together with a vertical deflecting coil provided for other purpose. In FIG. 4, the ½-frequency-division dedicated flip-flop 25', the horizontal deflecting direction change-over switch circuit 27 and the horizontal deflecting coil 4 cooperate to constitute a reciprocative horizontal deflection unit or circuit. Next, operation of the reciprocative deflection type CRT display apparatus according to the instant embodiment of the invention will be elucidated by reference to FIG. 6.

Figure 6:
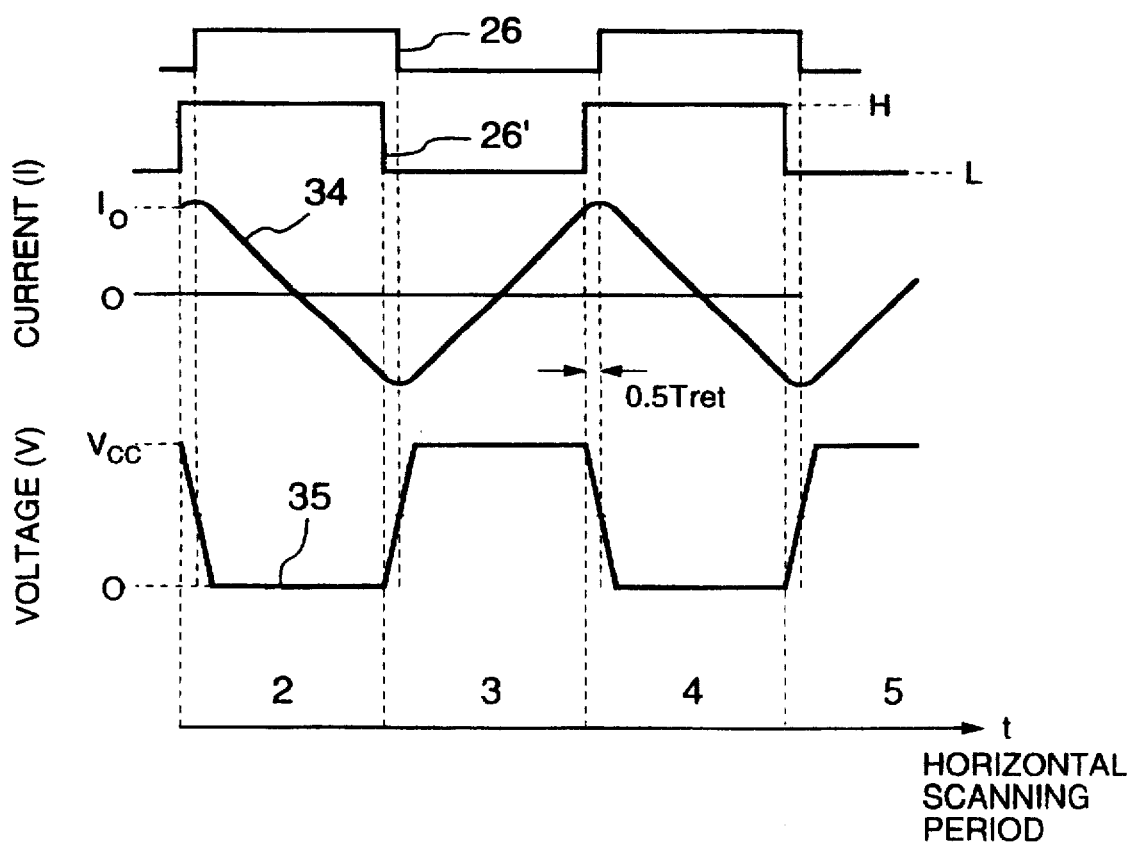
FIG. 6 is a timing chart for illustrating the operation of the circuit shown in FIG. 4.
Figure 7:
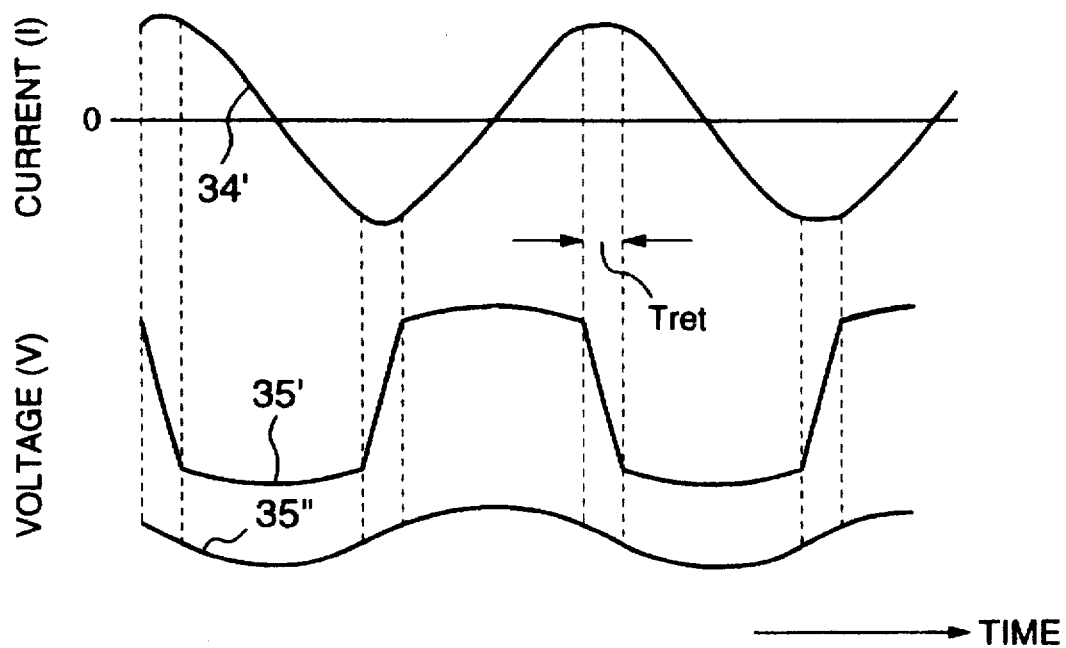
FIG. 7 is a waveform diagram for illustrating the operation of the circuit shown in FIG. 4.

In FIG. 6, a curve 26' represents a waveform of the 0.5 $f_H$-pulse signal mentioned previously while curves 34 and 35 represent, respectively, a waveform of a current flowing through the horizontal deflecting coil 4 and a waveform of the voltage making appearance across the horizontal deflecting coil 4. It will be appreciated from FIG. 6 that the reciprocative horizontal deflection can be realized. Furthermore, it can also be seen from FIG. 6 that the delay time as involved in the reciprocative horizontal deflection is equal to about 0.5 $T_{ret}$ where $T_{ret}$ represents the horizontal flyback interval (refer to the expression (8) mentioned hereinafter). Referring to FIG. 7, there are illustrated a waveform 34' of the current flowing through the horizontal deflecting coil 4, a waveform 35' of the voltage appearing thereacross and a waveform 35" of a voltage applied across the S-like distortion correcting capacitor 8, wherein these waveforms are depicted by taking into account the function of the S-like distortion correcting capacitor 8.

Figure 5:
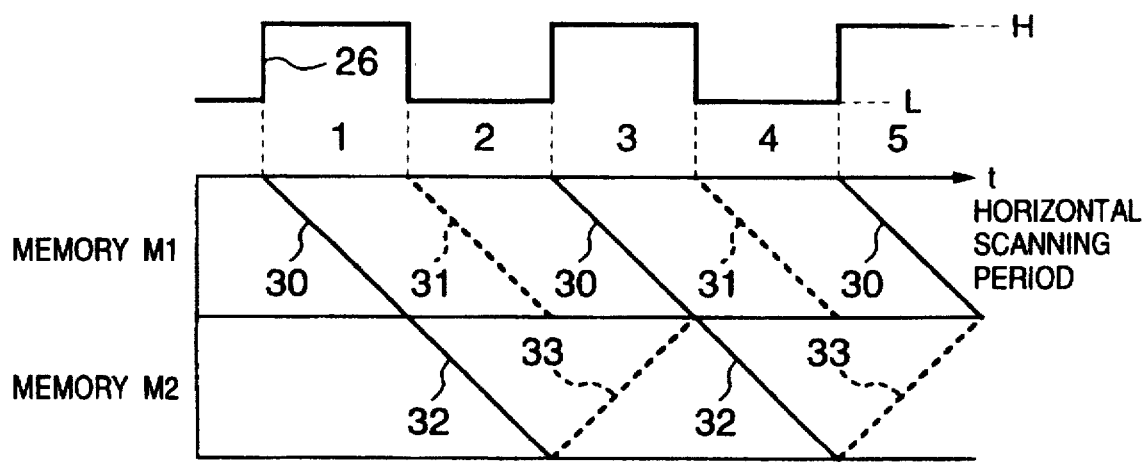
FIG. 5 is a timing chart for graphically illustrating operation of the reciprocative horizontal deflection circuit shown in FIG. 4.

FIG. 5 is a view for graphically illustrating operation of the line scanning direction alternating circuit 15 shown in FIG. 4. In FIG. 5, time (t) is taken along the abscissa, wherein identification numbers of the scanning lines are inserted. A curve 26 represents the waveform of the 0.5 $f_H$-pulse signal mentioned previously. Further, symbols M1 and M2 designate line memories, respectively, wherein the address coordinates of these line memories are taken along the ordinate. In FIG. 5, each of oblique solid lines 30 indicates the timing for writing the input picture signal on the odd-numbered scanning line into the memory M1, while each of oblique dotted lines 31 indicates the timing at which the picture signals mentioned above are read out from the memory M1. Similarly, oblique solid lines 32 and oblique dotted lines 33 indicate the write and read-timings, respectively, for the input picture signal on the even-numbered scanning lines to and from the memory M2. As can be seen from FIG. 5, the picture signals are read out from the memory M1 in the forward direction, while the picture signals are read out from the memory M2 in the reverse or backward direction. Thus, intersection or alternation of the line scanning directions can be realized. As a modification of the instant embodiment of the invention, the line scanning direction change-over circuit may be provided in association with a signal source of a computer. In that case, an identifying signal for identifying discriminatively the forward and reverse scannings is transmitted to the CRT display apparatus from the signal source mentioned above.

Again referring to FIG. 4, reference numerals 28 and 29 denote variable delay circuits, respectively, wherein the delay times of these delay circuits 28 and 29 can be adjusted with DC voltages applied to delay time input terminals 28' and 29', respectively, from an external circuit (not shown). In practical applications, each of the variable delay circuits 28 and 29 may be constituted by using a single-shot multivibrator.

By adjusting the delay time of the variable delay circuit 28, horizontal position of the reproduced picture can be regulated or adjusted.

On the other hand, the delay time of the variable delay circuit 29 is so set as to be approximately equal to a half of the horizontal retrace interval (i.e., 0.5 $T_{ret}$). By virtue of this arrangement, the delay time of the reciprocative horizontal deflection circuit mentioned hereinbefore can be compensated for.

Deviation or errors of the delay time of the variable delay circuit 28 makes appearance as zigzagged vertical line interference. To say in another way, the variable delay circuit 29 serves for correcting or compensating for the zigzagged vertical line interval. Any further description by reference to FIG. 4 will be unnecessary.

Figure 8:
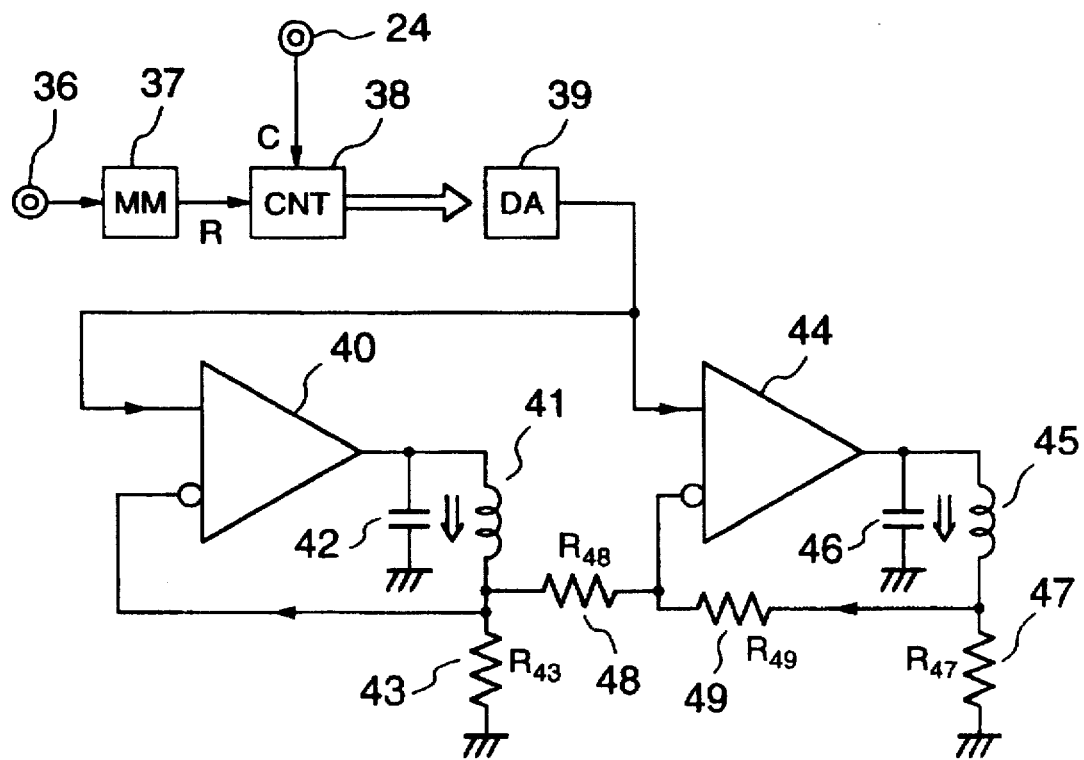
FIG. 8 is a block diagram showing a circuit configuration of a stepwise vertical deflection circuit according to another embodiment of the present invention.

Now, reference is made to FIG. 8 which is a block diagram showing a structure of a stepwise vertical deflection circuit according to another embodiment of the present invention. With this circuit arrangement, it is contemplated to solve a problem that intervals between the scanning lines become nonuniform (or out of alignment) at both left and right ends of a display screen (refer to FIGS. 17A and 17B). In FIG. 8, reference numeral 36 denotes a vertical synchronizing signal input terminal, 37 denotes a vertical scanning phase adjusting single-shot multivibrator (MM), 38 denotes a counter (CNT), and the reference numeral 24 designates the $f_H$-pulse signal mentioned hereinbefore in conjunction with FIG. 4. The counter 38 is adapted to count the $f_H$-pulses 24 and reset in respect to the vertical synchronizing signal. Further, reference numeral 39 denotes a D/A converter (D/A), 40 denotes a low-speed negative feedback amplifier employed in a conventional vertical deflection circuit, and 41 denotes a vertical deflecting coil which is mounted on the deflection yoke 4' shown in FIG. 4. Further, reference numeral 42 denotes a resonance capacitor, 43 denotes a vertical deflection current detecting resistor, 44 denotes a high-speed minute (or fine) amplitude deflecting negative feedback amplifier, and 45 denotes an auxiliary vertical deflecting coil which is mounted on the auxiliary deflection yoke 4". Furthermore, reference numeral 46 denotes a resonance capacitor, 47 denotes an auxiliary vertical deflection current detecting resistor, and numerals 48 and 49 denote resistors, respectively. The values of the individual resistors mentioned are so selected as to satisfy the conditions given by the following expressions (5), (6) and (7)

$$R_{43} \ll R_{45} \ll R_{49} \tag{5}$$

$$R_{47} \ll R_{49} \tag{6}$$

$$\frac{R_{43}}{R_{43}+R_{49}} \cdot \frac{R_{47}}{R_{43}} = \frac{K_2}{K_1} \tag{7}$$

where $K_1$ represents magnitude of deflection effected by the vertical deflecting coil per unit current, and $K_2$ represents magnitude of deflection effected by the auxiliary deflecting coil per unit current.

The expression (7) defines the condition for compensating for difference in the deflection sensitivity between the vertical deflecting coil 41 and the auxiliary vertical deflecting coil 45 for thereby matching the deflection sensitivities thereof with each other.

Figure 9:
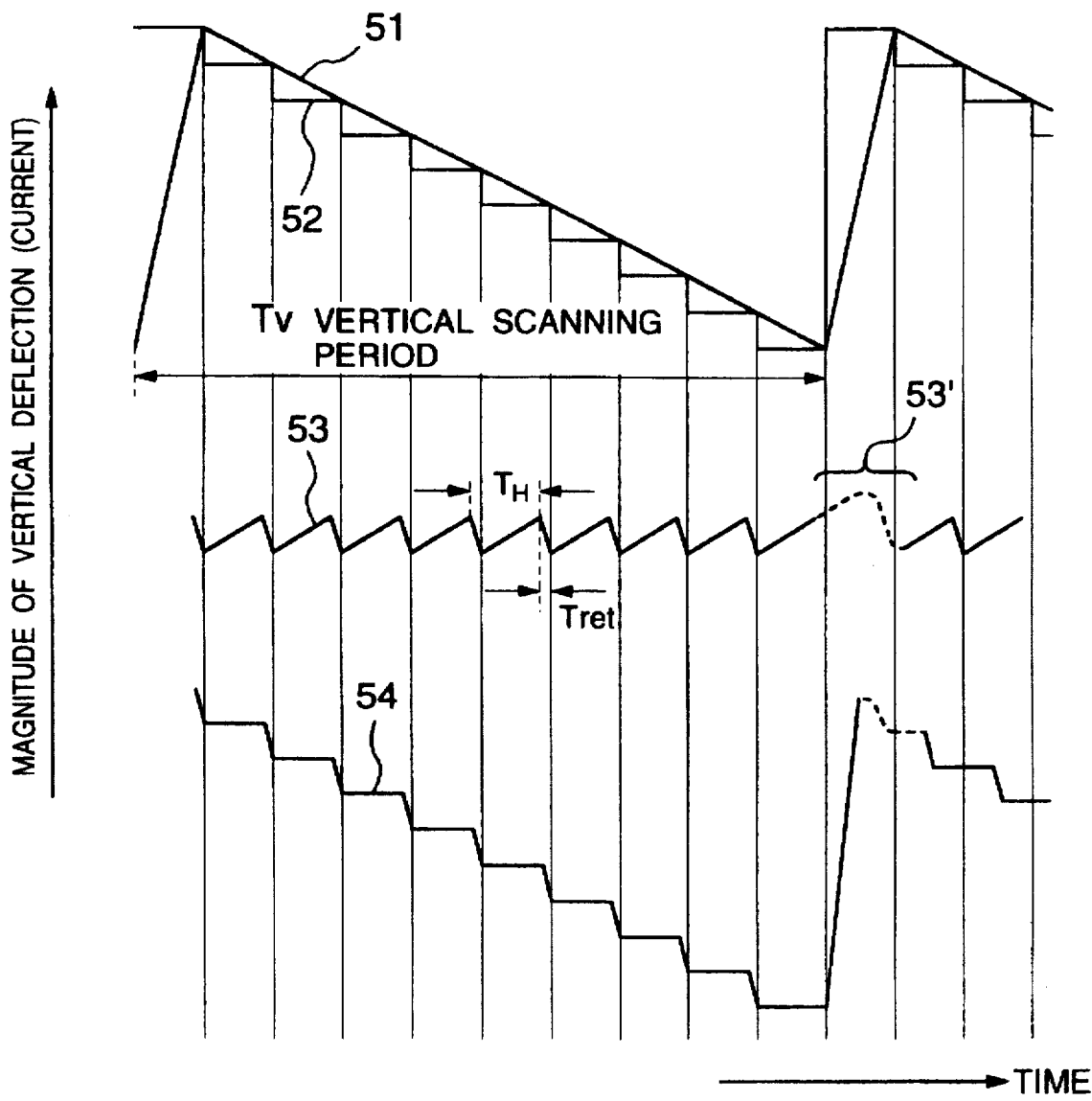
FIG. 9 is a waveform diagram for illustrating operation of the stepwise vertical deflection circuit shown in FIG. 8.

FIG. 9 is a waveform diagram for illustrating operation of the stepwise vertical deflection circuit. In the figure, a curve 52 represents a waveform which is in proportion to the output of the D/A converter 39, and 51 represents magnitude of vertical deflection which is in proportion to a current of a linear saw-tooth current flowing through the vertical deflecting coil 41. The reason why the output signal is of a linear saw-tooth waveform from which fine stepwise components have been eliminated nevertheless of the continuous fine stepwise waveform 52 of the input signal can be explained by the fact that the conventional vertical deflection circuit is low in response. A waveform 53 represents magnitude of auxiliary deflection effected additively by the vertical auxiliary coil 45, and represents approximately a difference between the waveforms 51 and 53. A curve 54 represents a sum of the waveforms 51 and 53 and thus represents an overall vertical deflection. As can be appreciated from the waveform 54, the stepwise vertical deflection as intended can be realized with the circuit configuration shown in FIG. 8. In FIG. 9, a waveform 53' during the vertical retrace interval suffers abnormality more or less, which however gives rise to no problem in practical applications because the vertical retrace interval falls within a picture non-display period. It is believed that operation or function of the stepwise vertical saw-tooth deflection circuit can be understood from the foregoing description.

Figure 10:
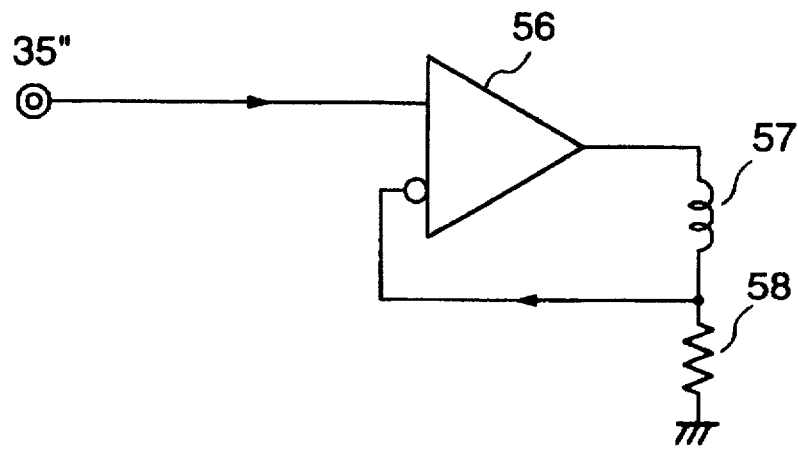
FIG. 10 is a circuit diagram showing a picture display speed modulating circuit according to yet another embodiment of the present invention.

FIG. 10 shows a circuit configuration of a horizontal deflecting speed modulating circuit according to another embodiment of the present invention. Referring to the figure, there is inputted to a terminal 35" a signal of a waveform which is in proportion to the waveform of the voltage (35" in FIG. 7) applied across the S-like distortion correcting capacitor 8 shown in FIG. 4. More specifically, the waveform of the signal applied to the terminal 35" is represented by an alternative repetition of parabolic waveforms of positive and negative polarities, respectively. In FIG. 10, reference numeral 56 denotes a negative feedback amplifier, and 57 denotes an auxiliary horizontal deflecting coil, which is mounted on the horizontal deflection yoke 4" shown in FIG. 4. Further, reference numeral 58 denotes a current detecting resistor.

Figure 16A:
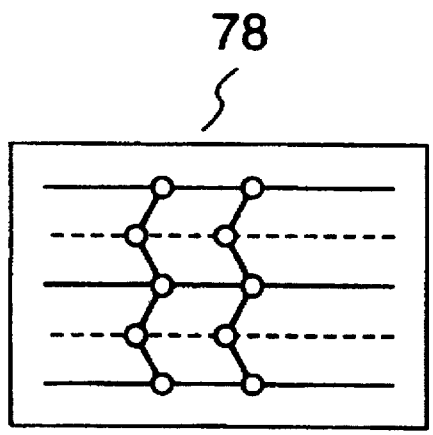
FIG. 16A is a view for graphically illustrating zigzagged vertical line interference.
Figure 16B:
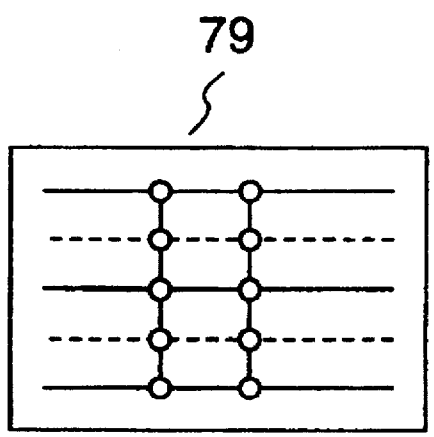
FIG. 16B is a view for graphically illustrating how the zigzagged vertical line interference can be corrected according to the teachings of the invention.

Operation of the horizontal deflecting speed modulating circuit shown in FIG. 10 will be elucidated by reference to FIGS. 16A and 16B. Illustrated by way of example in FIG. 16A at 78 is a zigzagged vertical line interference which is inherent to the CRT display equipped with the reciprocative horizontal deflecting circuit. In the figure, horizontal solid lines represent the scanning lies in the forward direction (i.e., from the left to the right) while horizontal dotted lines represents the scanning lines in the reverse or backward direction on the assumption that two vertical lines are to be displayed on the CRT screen. Such zigzagged vertical line interference takes place due to a secondary distortion ascribable to a resistance loss intrinsic to the horizontal deflecting coil. By virtue of the circuit arrangement shown in FIG. 10, the amplitude of the parabolic waveform signal inputted to the terminal 35" is set to be equal to magnitude of the secondary distortion of the horizontal deflection circuit.

Thus, by adopting the circuit shown in FIG. 10, zigzagged vertical line interference can be suppressed or canceled out, as shown in FIG. 16B at 79. As an alternative, a signal resulting from the D/A conversion of an output of a digital memory may be applied to the input terminal 35", which can easily be implemented by resorting to a digital convergence technique well known in the art.

Figure 11:
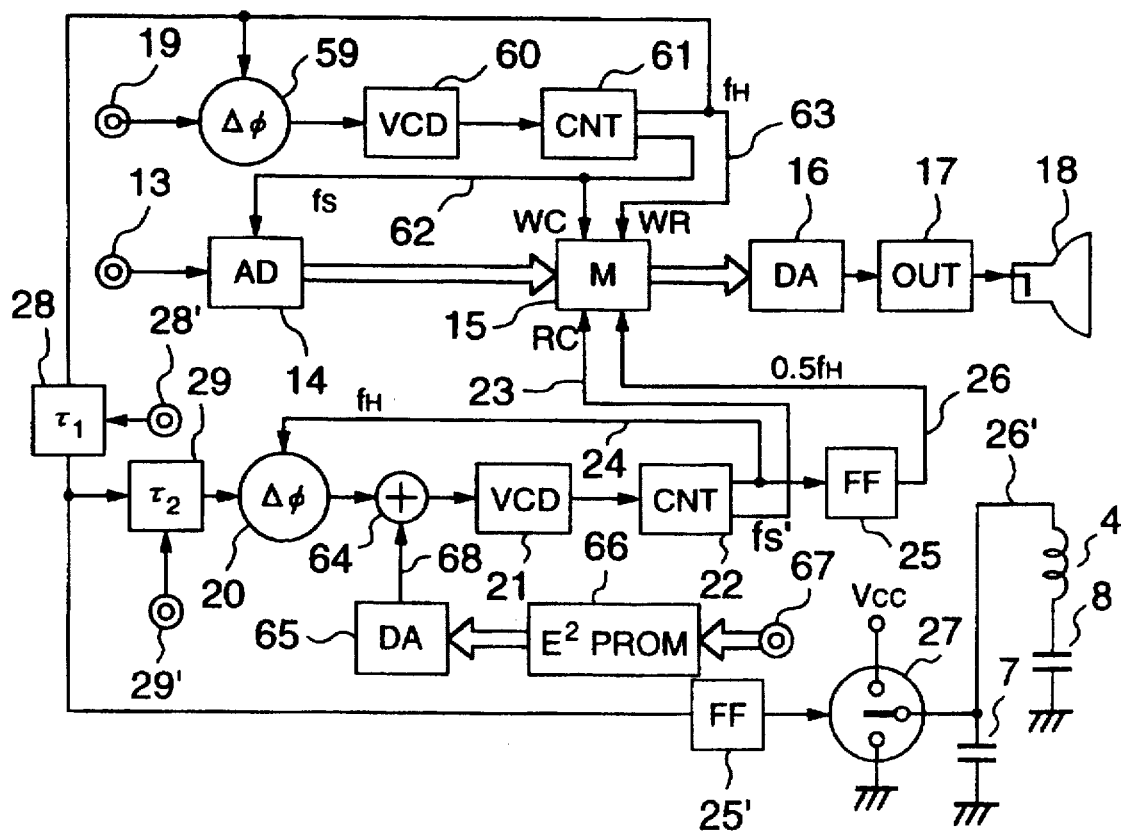
FIG. 11 is a circuit diagram showing a modification of the picture display speed modulating circuit shown in FIG. 10.

FIG. 11 shows a picture send-out speed modulating circuit according to an embodiment of the invention. The horizontal deflecting speed modulating circuit shown in FIG. 10 is destined to correct the distortion of the horizontal deflection by making use of the auxiliary horizontal deflection. On the other hand, the picture send-out speed modulating circuit shown in FIG. 11 is so designed as to realize an equivalent correction of the horizontal deflection by modulating the timing at which the picture signal is outputted to the cathode electrode of the CRT without correcting directly the horizontal deflection distortion itself.

In FIG. 11, reference numerals 4, 8 and 13 to 29 denote same or equivalent components described hereinbefore. Reference numerals 59, 60 and 61 denote a phase detector, a voltage-controlled oscillator and a counter, respectively, which cooperate to constitute a phase-locked loop or PLL. Further, numeral 64 denotes an adder, 65 denotes a D/A converter and 66 denotes a programmable memory, which cooperate to constitute the picture send-out speed modulating circuit according to the instant embodiment of the invention.

Next, description will turn to operation of the circuit shown in FIG. 11. Applied to an address signal input terminal 67 of the programmable memory 66 is an address signal which is formed by output pulses of the counter 22. This circuit portion can easily be realized by applying a so-called digital convergence circuit technique well known in the art. The write timing for the line scanning direction alternating circuit 15 is determined by output pulses of the phase-locked loop constituted by the phase detector 59, voltage-controlled oscillator 60 and the counter 61.

On the other hand, data read-out timing of the line scanning direction alternating circuit 15 is determined by the output pulses of the PLL constituted by the phase detector 20, the adder 64, the voltage-controlled oscillator 21 and the counter 22. Stored in the programmable memory 66 are data representing the deflection speed distortion of the horizontal deflection circuit mentioned previously. The data are read out from the programmable memory 66 in response to the address signal 67 to be utilized for controlling the frequency of the voltage-controlled oscillator 21 via the D/A converter 65 and the adder 64. The output of the voltage-controlled oscillator 21 is used for controlling the read-out speed for the line scanning direction alternating circuit 15. More specifically, when the horizontal deflection speed is low, the picture read-out/send-out speed is decreased, while when the horizontal deflection speed is high, the picture read-out/send-out speed is increased. Thus, the zigzagged vertical line interference such as illustrated in FIG. 16A can equivalently be canceled out. As a modification of the circuit shown in FIG. 11, the circuitry composed of the adder 64, the D/A converter 65 and the programmable memory 66 may be so arranged as to realize the digital convergence correction in the horizontal direction as well.

Although circuit arrangement shown in FIG. 11 is advantageous over that shown in FIG. 10 in the respect that the auxiliary horizontal deflecting coil 57 can be spared, the former is disadvantageous in that luminances of the scanning lines are non-uniform, which can be explained by the fact that in general, the deflection speed of the horizontal deflection circuit is high in an earlier half of each scanning period while it is low in the latter half and that luminance of the scanning lines in the earlier half is low when compared with that in the latter half. Such difference in the luminance is prone to be more remarkable in the reciprocative scanning system. By way of example, the scanning lines in the forward direction become dark (or bright) in left (or right) half portions due to high (or low) speed scanning while the scanning lines in the reverse direction become bright (or dark) in the left (or right) half portions because of the low (or high) speed scanning.

Figure 12:
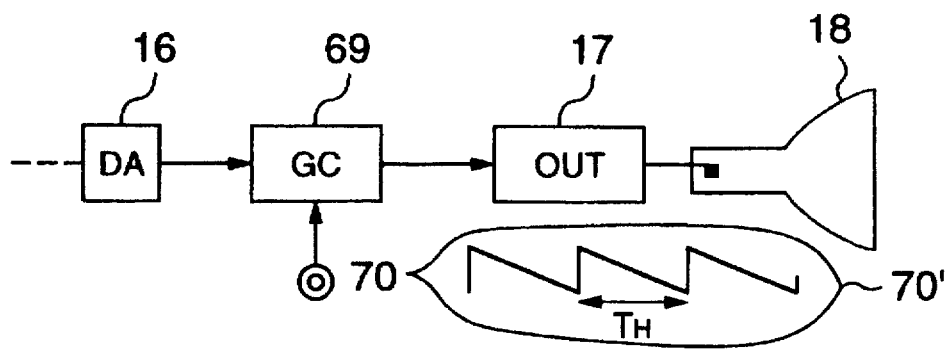
FIG. 12 is a block diagram showing a configuration of a picture signal amplitude modulating circuit according to still another embodiment of the present invention.

FIG. 12 shows a circuit for canceling out such variations in the luminance of the scanning lines in the forward and backward directions according to a further embodiment of the invention. In the figure, reference numeral 16, 17 and 18 denote, respectively, the D/A converter, the output amplifier and the CRT described hereinbefore. Further, reference numeral 69 denotes a gain control circuit and 70 denotes a gain control signal input terminal, wherein a waveform of the signal applied to the gain control signal input terminal 70 is illustrated at 70' in FIG. 12, by way of example. As the gain control signal, a signal which is in proportion to the output signal of the D/A converter 65 may be used. With the circuit arrangement shown in FIG. 12, the luminance variation interference can satisfactorily be compensated for.

Figure 13:
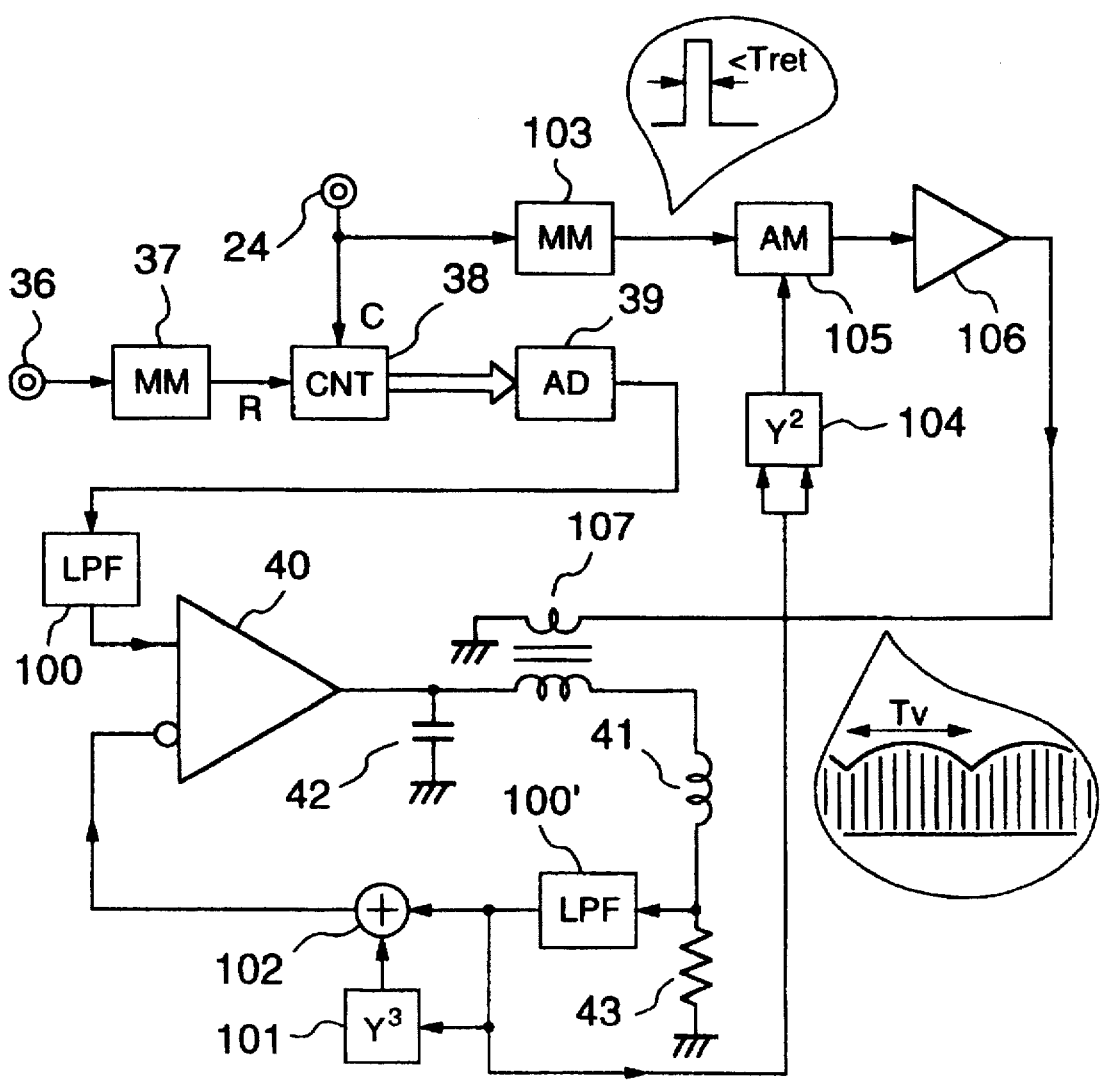
FIG. 13 is a block diagram showing a modification of the stepwise vertical deflection circuit shown in FIG. 8.

FIG. 13 shows a modification of the stepwise vertical deflection circuit according to the present invention. In the figure, reference numerals 36, 37, 24, 38, 39, 40, 41, 42, 43 and 44 denote equivalent or same components as those shown in FIG. 8.

Further, in FIG. 13, reference characters 100 and 100' denote low-pass filters each of which is so designed as to pass therethrough the frequency components which are lower than the horizontal frequency.

Further referring to FIG. 13, reference numeral 103 denotes a single-shot multivibrator which generates as the output thereof a horizontal pulse signal having a pulse width shorter than the horizontal retrace interval ($T_{ret}$). Further, reference numeral 104 denotes a multiplier which is designed to output a signal representing a square ($Y^2$) of the vertical sawtooth waveform signal. Furthermore, reference numeral 105 denotes an amplitude modulation circuit, 106 denotes a pulse amplifier and 107 denotes a pulse transformer. As is shown in FIG. 13, there makes appearance at the input of the pulse transformer 107 a horizontal pulse voltage of a waveform which results from amplitude modulation of the horizontal pulse signal by the parabolic waveform signal of the vertical scanning period ($T_V$). The horizontal pulse voltage motioned above is applied to the vertical deflecting coil 41 via the pulse transformer 107, as a result of which a sawtooth waveform current of a very small amplitude having the horizontal scanning period $T_H$ similar to that of the waveform 53 mentioned hereinbefore in conjunction with FIG. 7 flows through the vertical deflecting coil 41. Parenthetically, in FIG. 13, reference numeral 101 denotes a cubing circuit and 102 denotes an adder, both of which serve for canceling out the S-like vertical distortion. Further, the amplitude modulation circuit 105 serves for the function for uniformizing the scanning line intervals or inter-line distances in dependence on the S-like vertical distortion. It is believed that the structure and operation of the stepwise vertical deflection circuit shown in FIG. 13 can be understood from the foregoing without any further explanation.

However, in conjunction with the circuit configuration shown in FIG. 13, it should be mentioned that the low-pass filters 100 and 100', the single-shot multivibrator 103, the multiplier 104, the amplitude modulation circuit 105, the pulse amplifier 106 and the pulse transformer 107 may be spared by employing a high-speed negative feedback amplifier as the negative feedback amplifier 40. In that case, however, it will be required to provide additionally a subtracting circuit for canceling out crosstalk brought about by leakage of the horizontal deflection current into the vertical deflecting coil 41 of the deflection yoke.

Figure 14:
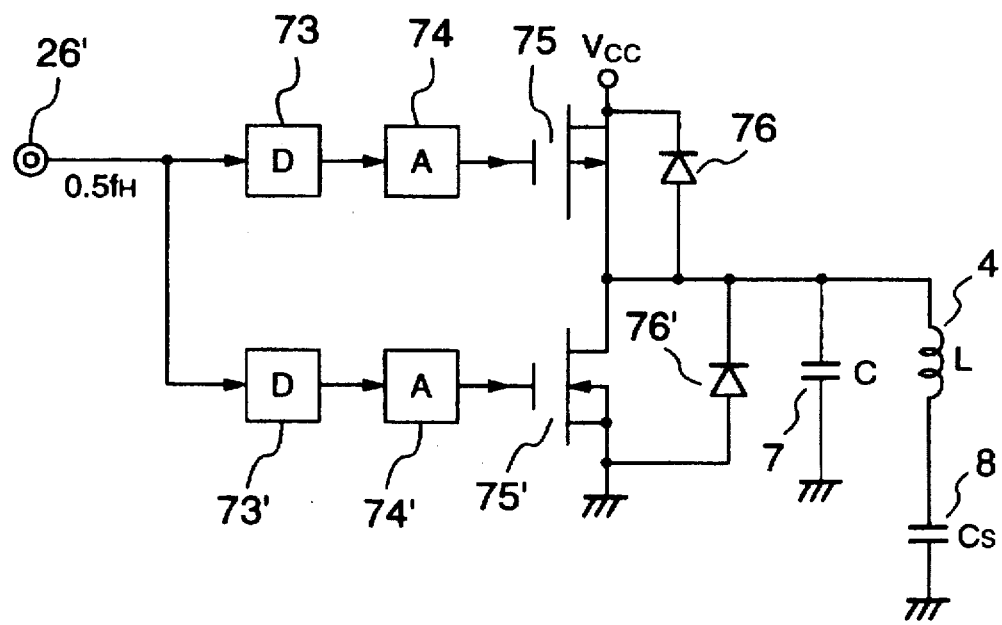
FIG. 14 is a circuit diagram showing a structure of a horizontal deflecting direction change-over circuit according to a further embodiment of the present invention.
Figure 15:
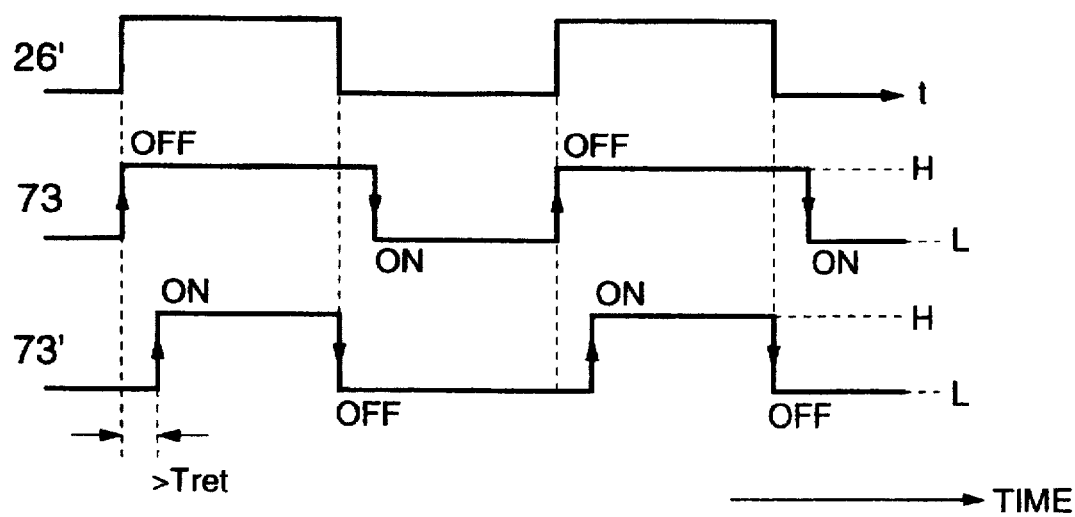
FIG. 15 is a waveform diagram for illustrating operation of the horizontal deflecting direction change-over circuit shown in FIG. 14.

FIG. 14 shows a modification of the horizontal deflecting direction switching circuit. In the figure, reference character 26' designates an input terminal for the 0.5 $f_H$-pulse signal. Further, reference character 73 denotes a pulse falling edge delay circuit, 73' denotes a pulse rise-up edge delay circuit, 74 and 74' denote driving amplifiers, respectively, 75 and 75' denote a P-channel MOS transistor and an N-channel MOS transistor for reverse (backward) and forward deflections, respectively, 76 and 76' denote damper diodes, respectively, 7 denotes a resonance capacitor, 4 denotes a horizontal deflecting coil, and numeral 8 denotes an S-like distortion correcting capacitor. FIG. 15 is a waveform diagram for illustrating operation of the horizontal deflecting direction switching circuit shown in FIG. 14. In FIG. 15, a curve 26' represents the waveform of the signal supplied to the input terminal 26' shown in FIG. 14, a curve 73 represents a waveform of the signal outputted from the pulse falling edge delay circuit 73 showing the FIG. 14 and a curve 73' represents the signal outputted from the pulse rise-up edge delay circuit 73' shown in FIG. 14. The P-channel MOS transistor 75 is turned on (conducting) only during a period in which the output signal of the pulse falling edge delay circuit 73 is in the "L" state, while the N-channel MOS transistor 75' is turned on only during a period in which the output signal of the pulse rise-up edge delay circuit 73' is in the "H" state. As can be seen from FIG. 15, after turn-off one of the transistors 75 and 75', the other is tuned on after lapse of a time which is longer than the horizontal retrace interval ($T_{ret}$). Thus, abnormal loss which may occur if both of the transistors 75 and 75' should simultaneously be turned on can be prevented. In the case of the circuit arrangement now under consideration, the value "C" of the horizontal retrace interval resonance capacitor 7 is determined by the expressions mentioned below in place of the expression (2) mentioned previously.

$$C = \frac{I_0 T_{ret}}{V_{cc}} \quad (8)$$

$$I_0 = \frac{V_{cc} T_H}{2L} \quad (9)$$

$$\therefore C = \frac{T_H T_{ret}}{2L} = \frac{T_H^2}{12L} \quad (10)$$

As can readily be understood from comparison of the expression (10) with the expression (2), the value "C" of the resonance capacitor 7 can be increased by a factor of "10" or more when compared with the conventional or prior technique. This in turn means that the power loss involved in accompanying the switching operation of the horizontal output transistors determined in accordance with the loss evaluation expression (1) mentioned hereinbefore can be reduced about one tenth or less.

Figure 17A:
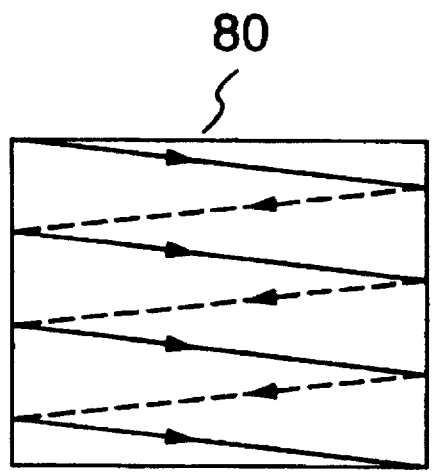
FIG. 17A is a view for graphically illustrating a scanning line pattern in the case where the stepwise vertical deflection circuit is not employed.
Figure 17B:
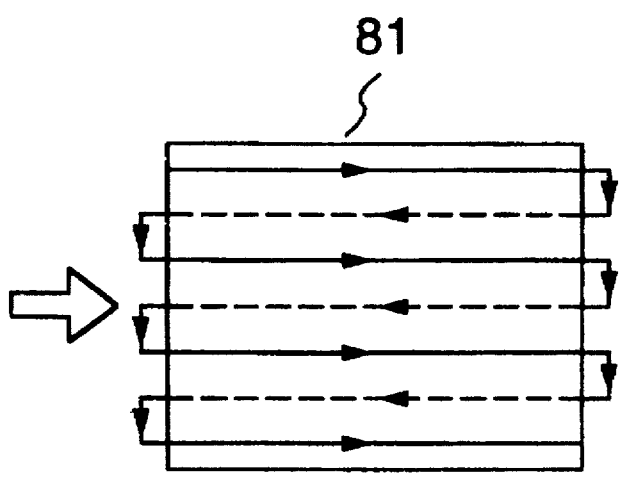
FIG. 17B is a view for graphically illustrating a scanning line pattern in the case where the stepwise vertical deflection circuit is employed.

FIGS. 17A and 17B illustrate scanning line patterns as generated in the CRT display in the cases where the stepwise vertical deflection circuit is provided and it is absent, respectively. More specifically, the scanning line pattern generated when the stepwise vertical deflection circuit is absent is illustrated at 80 in FIG. 17, while the scanning line pattern generated in the case where the stepwise vertical deflection circuit is provided is illustrated at 81 in FIG. 17B. It can be appreciated that the intervals or inter-line distances between the scanning lines are uniformized when the stepwise vertical deflection circuit is provided or "present".

Figure 1:
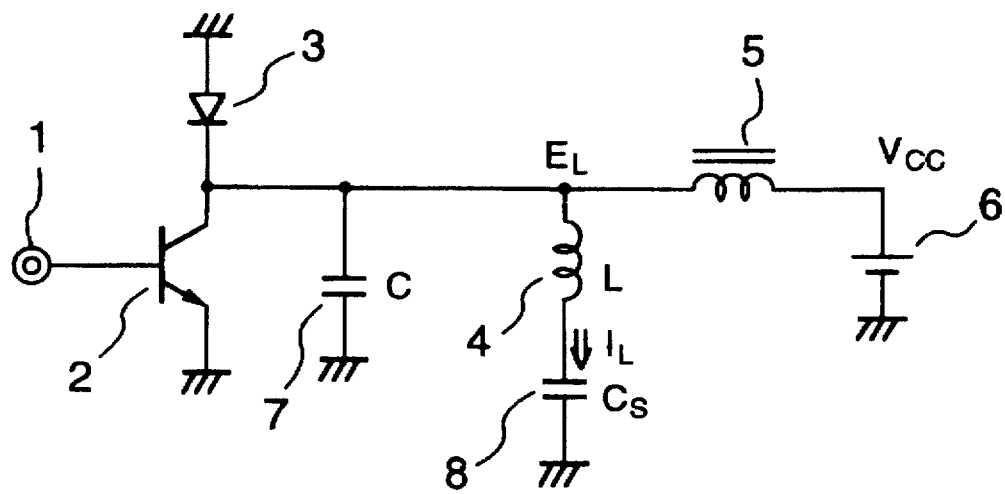
FIG. 1 is a wiring diagram showing a configuration of a horizontal deflection output circuit adopted in a CRT display apparatus known heretofore.
Figure 2:
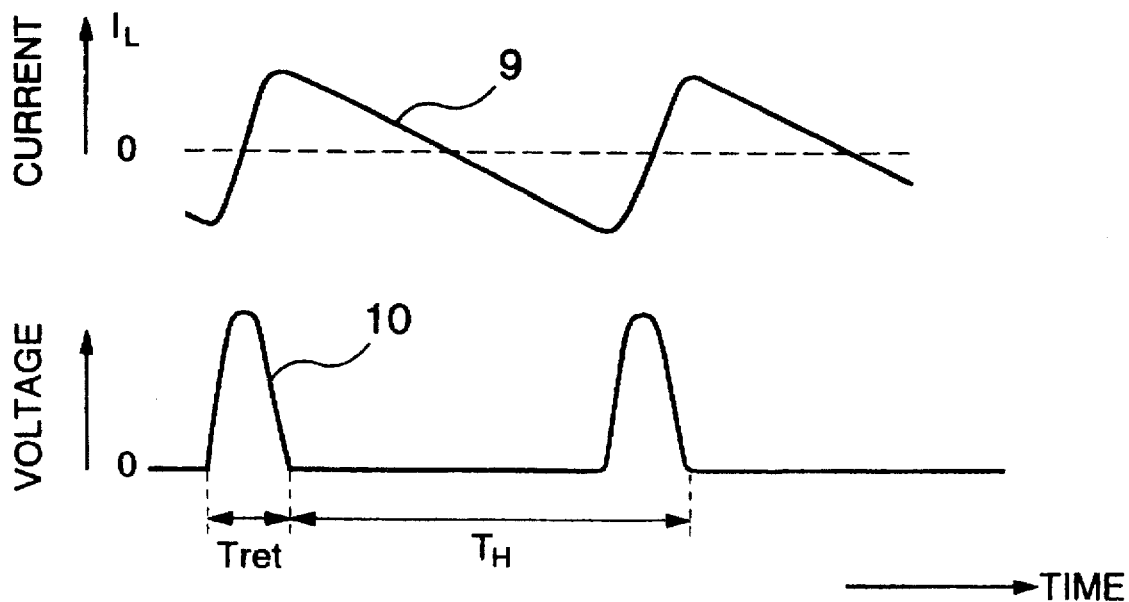
FIG. 2 is a view for graphically illustrating a current flowing through a deflecting coil shown in FIG. 1 and a voltage appearing thereacross.
Figure 3:
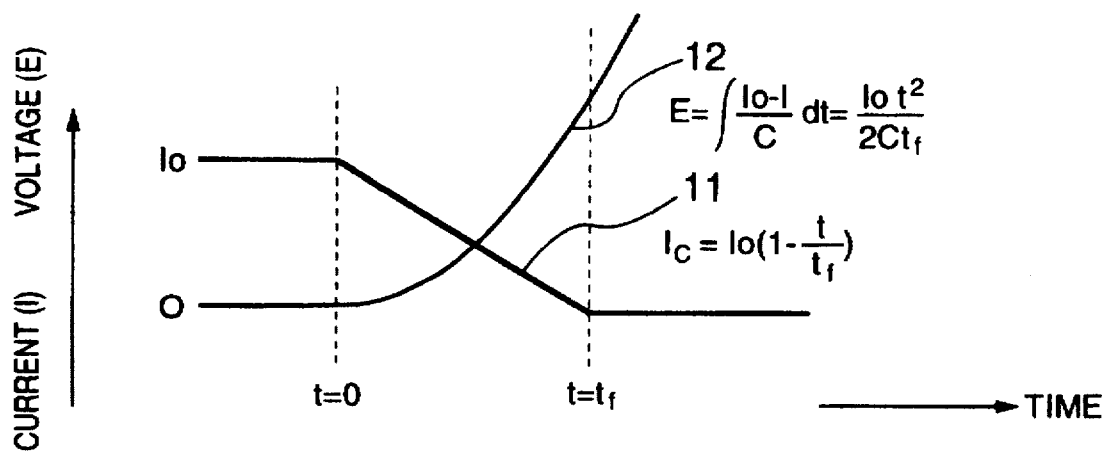
FIG. 3 shows exaggeratedly voltage and current waveforms of FIG. 2 for illustrating power loss in the circuit shown in FIG. 1.

When the reciprocative deflection type CRT display apparatus according to the present invention is operated in the environment in which the ambient temperature changes remarkably, it is preferred to provide a temperature detector such as a thermocouple in association with the deflection yoke e.g. 4' in FIG. 4) to thereby control the gain of the D/A converter 65 shown in FIG. 1.

Figure 18:
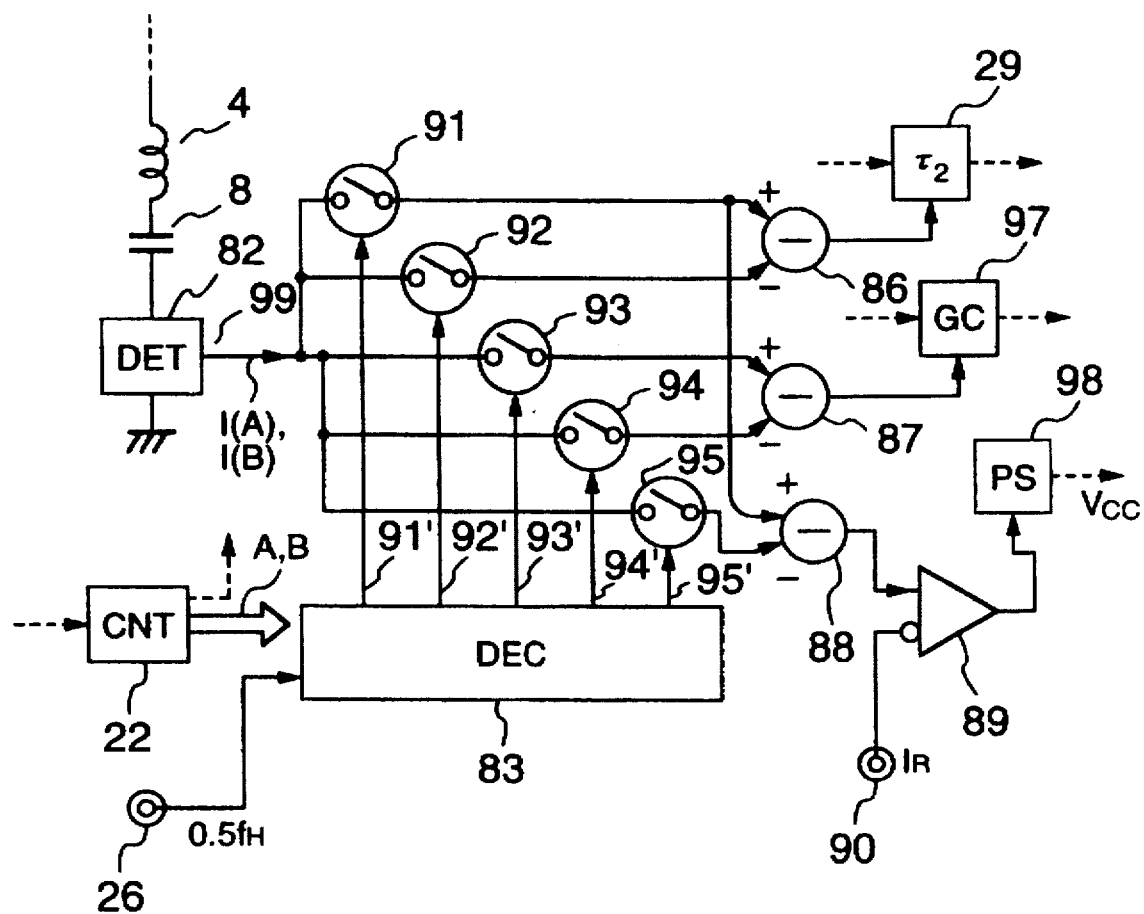
FIG. 18 is a block diagram showing a circuit configuration for automatically canceling out the zigzagged vertical line interference.

FIG. 18 shows a circuit configuration for automatically canceling the zigzagged vertical line interference which is intrinsic to the reciprocative horizontal deflection system. The circuit arrangement shown in FIG. 18 is designed to be used in combination with the circuit arrangement described hereinbefore by reference to FIG. 11. In FIG. 18, reference numerals 4, 8, 22, 26 and 29 designate those circuit components which are same as or equivalent to those designated by the like reference characters in FIG. 11. Further, reference numeral 82 denotes a horizontal deflection current detecting circuitry which may be constituted by a resistor circuitry or a circuitry constituted by a transformer and a load resistor, wherein there can be obtained from the output of the horizontal deflection current detecting circuit 82 a horizontal scanning position signal I which bears one-to-one correspondence relation to the horizontal coordinates on the reproduced picture. In this conjunction, the signal I in the forward scanning interval is designated by I(A), while the in the backward or reverse direction, it is designated by I(B), wherein "A" and "B" represent the binary output signal of the counter 22. In FIG. 18, reference numerals 91 to 95 designate sample-and-hold circuits, respectively, 86, 87 and 88 denote subtractors, respectively, 89 denotes a comparison amplifier, and 90 denotes a terminal to which a comparison reference voltage $I_R$ is applied. Further, reference numeral 97 denotes a gain control circuit, 98 denotes a source voltage control circuit and 83 denotes a sampling pulse generating decoder circuit having output terminals at which sampling pulse signals 91' to 95' are generated. Next, description will be directed to the operation of the circuit shown in FIG. 18 by reference to a waveform diagram of FIG. 19.

Figure 19:
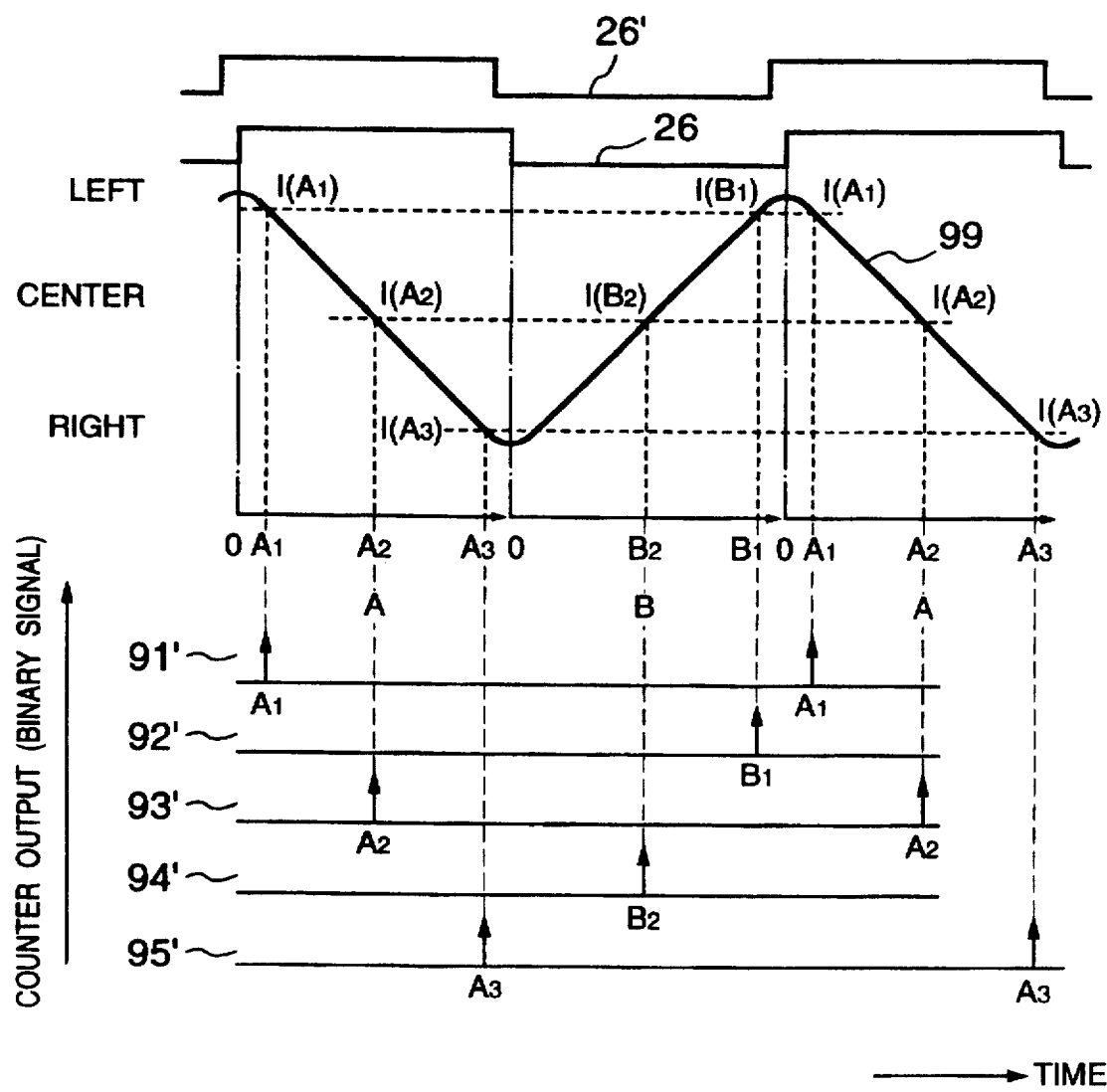
FIG. 19 is a waveform diagram for illustrating operation of the circuit shown in FIG. 18.

In FIG. 19, curves 26' and 26 represent the waveforms of the 0.5 $f_H$-pulse signal mentioned previously. Further, a curve 99 represents a waveform of the horizontal scanning position signal I(A), I(B) which is in proportion to that of the horizontal deflection current (waveform 34 shown in FIG. 6) mentioned hereinbefore. The scanning period in the forward direction is taken along the abscissa and indicated by "A" while the scanning period in the backward or reverse direction also taken along the abscissa is indicated by "B". Thus, $A_1$, $A_2$ and $A_3$ represent counter output binary signals at the left-hand end, at the center and at the right-hand end, respectively, on a reproduced picture during the scanning period in the forward picture. Similarly, $B_1$ and $B_2$ represent the counter outputs at the left-hand end and at the center, respectively, during the reverse scanning period. The values of the $A_1$–$A_3$ and $B_1$, $B_2$ are selected so that the conditions given by the following expressions are satisfied.

$$D = f_s/f_H \quad (11)$$

$$A_2 = 0.5D \quad (12)$$

$$B_2 = D - A_2 \quad (13)$$

$$A_1 = 0.1D \quad (14)$$

$$B_1 = D - A_1 \quad (15)$$

$$A_3 = 0.9D \quad (16)$$

In the above expressions, D represents a total number of pixels scanned during a single horizontal scanning period, $f_s$ represents the sampling frequency of the A/D converter mentioned hereinbefore, and $f_H$ represents the horizontal scanning frequency. In accordance with the definitions of the expressions (12) to (15) mentioned above, zigzagged making appearance at the left-hand end on the reproduced picture can be canceled out by making the horizontal scanning position signals $I(A_1)$ and $I(B_1)$ coincide with each other, while the zigzagged vertical line interference at the center can be suppressed by making the horizontal scanning position signals $I(A_2)$ and $I(B_2)$ coincide with each other.

The decoder 83 generates sampling pulses 91' to 95' at the time points at which the counter outputs A and B coincide with $A_1$, $A_2$, $A_3$ and $B_1$ and $B_2$, respectively. Thus, there can be obtained the horizontal scanning position signals $I(A_1)$, $I(B_1)$, $I(A_2)$, $I(B_2)$, $I(A_3)$ as the outputs of the sample-and-hold circuits 91 to 95, respectively. In this manner, the control input terminals of the variable delay circuit 29, the pain control circuit 97 and the source voltage control circuit 98 are applied with the signals which are in proportion to signal differences $I(A_1)$–$I(B_1)$, $I(A_2)$–$I(B_2)$ and $I(A_1)$–$I(A_3)$ –$I_R$, respectively.

As the control input {$I(A_1)$–$I(B_1)$} increases or decreases, the delay time of the variable delay circuit 29 increases or decreases. Accordingly, by combining the circuit arrangements shown in FIGS. 11 and 18, such negative feedback control can be achieved that the value of the horizontal scanning position signal $I(A_1)$ can coincide with that of the position signal $I(B_1)$. In this way, the zigzagged vertical line interference at the left-hand end on the reproduced picture can automatically be canceled out.

Referring to FIG. 11, the pain control circuit 97 is inserted between the D/A converter 65 and the adder 64. The gain of the gain control circuit 97 increases or decreases as the control input {$I(A_2)$–$I(B_2)$} increases or decreases. Accordingly, by combining the circuit arrangements shown in FIGS. 11 and 18 with each other, such negative feedback can be realized that the value of the horizontal scanning position signal $I(A_2)$ coincides with that of the position signal $I(B_2)$. Thus, the zigzagged vertical line interference at the center portion of the reproduced picture can automatically be canceled out.

On the other hand, the source voltage control circuit 98 outputs the supply voltage $V_{cc}$ which is supplied to the horizontal deflecting direction change-over circuit 27 shown in FIG. 11. The supply voltage $V_{cc}$ can be increased or decreased by increasing or decreasing the control input {$I(A_1)$–$I(A_3)$–$I_R$} applied to the horizontal deflecting direction change-over circuit 27. Thus, by combining the circuit arrangement shown in FIG. 11 with that shown in FIG. 18, the value of {I(A₁)−I(A₃)} can automatically be made to coincide with the value $I_R$. This means that horizontal noise can automatically be made constant. Parenthetically, in order to suppress the pin-cushion distortion making appearance at left- and right-hand sides on the reproduced picture, a parabolic waveform signal of the vertical frequency (output of the squaring circuit 104) is synthesized in the waveform of the reference signal (i.e., $I_R$ applied to the terminal of the terminal 90 shown in FIG. 18).

Having described various exemplary embodiments of the present invention in the foregoing, advantageous effects assured by the invention will be summarized below.

By virtue of the circuit arrangement of the reciprocative horizontal deflection circuit according to the invention, the power loss involved in the switching operation of the horizontal deflection output transistor can be reduced to about 1/10 or less when compared with the poser loss in the prior art circuit.

With the stepwise vertical deflection circuit according to the invention, the scanning line intervals can be uniformized, whereby the quality of picture can be improved.

The picture display speed modulating circuit according to the invention is effective for mitigating or suppressing the zigzagged vertical line interference of the reproduced picture.

With the arrangement of the picture signal amplitude modulating circuit according to the invention, the scanning line luminance nonuniformity interference ascribable to distortion of the horizontal linearity can be suppressed.

By virtue of the advantageous features mentioned above, there can be provided according to the invention a superhigh definition CRT display apparatus having a horizontal deflection frequency higher than 130 kHz which could not be implemented by the conventional or prior techniques. Of course, the concept of the present invention can be incarnated in the CRT display whose horizontal frequency does not exceed 130 kHz. Besides, the invention can equally find application to a CRT display for a projection-type display apparatus. In any case, very profitable effect of the significant reduction of the power loss involved in the switching operation of the horizontal deflection output transistor can be achieved.

We claim:

1. A reciprocative deflection type CRT display apparatus comprising a picture signal processing circuit;

a horizontal deflection circuit including reciprocative horizontal deflection means;

said reciprocative horizontal deflection means including horizontal deflecting direction switching means, a horizontal deflecting coil and an S distortion correcting capacitor connected in series with one another;

said picture signal processing circuit including line scanning direction alternating means;

a vertical deflection circuit including stepwise vertical deflection means; and means for correcting zigzagged vertical line interference taking place due to linearity distortion of said horizontal deflection circuit, said correcting means including an auxiliary horizontal deflecting coil and horizontal deflection speed modulating means which supplies a current of a parabolic waveform to said auxiliary horizontal deflecting coil and which is so arranged such that the polarity of said parabolic waveform current is alternately inverted upon every horizontal scanning period.

2. A reciprocative deflection type CRT display apparatus comprising a picture signal processing circuit;

a horizontal deflection circuit including reciprocative horizontal deflection means;

said reciprocative horizontal deflection means including horizontal deflecting direction switching means, a horizontal deflecting coil and an S distortion correcting capacitor connected in series with one another;

said picture signal processing circuit including line scanning direction alternating means;

a vertical deflection circuit including stepwise vertical deflection means; and means for correcting zigzagged vertical line interference taking place due to linearity distortion of said horizontal deflection circuit, said correcting means including picture send-out speed modulating means and picture signal amplitude modulating means for mitigating scanning line luminance alternate-variation interference taking place in accompanying picture send-out speed modulation effected by said picture send-out speed modulating means.

3. A reciprocative deflection type CRT display apparatus comprising a picture signal processing circuit;

a horizontal deflection circuit including reciprocative horizontal deflection means;

said reciprocative horizontal deflection means including horizontal deflecting direction switching means, a horizontal deflecting coil and an S distortion correcting capacitor connected in series with one another;

said picture signal processing circuit including line scanning direction alternating means;

a vertical deflection circuit including stepwise vertical deflection means; and means for correcting zigzagged vertical line interference taking place due to linearity distortion of said horizontal deflection circuit;

automatic canceling means for canceling out zigzagged vertical line interference, said automatic canceling means including:

horizontal deflection current detecting means;

sample-and-hold means connected in succession to said horizontal deflection current detecting means;

subtracting means connected in succession to said sample-and-hold means; and variable delay means connected in succession to said subtracting means;

wherein deflecting timing of said horizontal deflection means is controllably delayed or advanced by increasing or decreasing a delay time of said variable delay means.

* * * * *

UNITED STATES PATENT AND TRADEMARK OFFICE
CERTIFICATE OF CORRECTION

PATENT NO. : 5,663,615
DATED : September 2, 1997
INVENTOR(S) : Masanori OGINO

It is certified that error appears in the above-identified patent and that said Letters Patent is hereby corrected as shown below:

| Column | Line | |
|---|---|---|
| 12 | 37 | Change "pain" to --gain--. |
| 12 | 50 | Change "pain" to --gain--. |

Signed and Sealed this

Seventeenth Day of February, 1998

Attest:

BRUCE LEHMAN

Attesting Officer

Commissioner of Patents and Trademarks